United States Patent [19]

Takahashi

[11] 4,079,720

[45] Mar. 21, 1978

[54] RELATIVE COMBINATION OF A CYLINDER AND A SEAL RING FOR INTERNAL COMBUSTION ENGINES

[75] Inventor: Kentaro Takahashi, Omiya, Japan

[73] Assignee: Nippon Piston Ring Co., Ltd., Tokyo, Japan

[21] Appl. No.: 685,474

[22] Filed: May 11, 1976

[30] Foreign Application Priority Data

May 13, 1975 Japan ................................ 50-50716

[51] Int. Cl.$^2$ .............................................. F16J 1/02
[52] U.S. Cl. .............................. 123/193 CP; 92/169; 277/235 R; 277/DIG. 6
[58] Field of Search .......................... 92/169, DIG. 1; 123/193 CP; 277/96, 96.2, 216, 224, 235 R, DIG. 6; 204/9

[56] References Cited

U.S. PATENT DOCUMENTS

| | | | |
|---|---|---|---|
| 3,061,525 | 10/1962 | Grazen | 204/9 |
| 3,727,524 | 8/1971 | Nishiyama | 92/169 |
| 3,731,941 | 5/1973 | Mori | 277/235 R |
| 3,808,955 | 5/1974 | Hamada | 92/169 |

*Primary Examiner*—Robert G. Nilson
*Attorney, Agent, or Firm*—Sughrue, Rothwell, Mion, Zinn and Macpeak

[57] ABSTRACT

Improved wear characteristics of a seal ring for a piston and a mating cylinder are obtained by using selected materials for the seal ring and cylinder. The cylinder is characterized by having a surface coating of Ni or Ni alloy containing 3% to 8% of SiC having a particle size of from 0.5μ to 5μ, or by having a base member of Al or Al alloy containing 13% to 23% of Si having a particle size of 5μ to 8μ. The seal ring is characterized by having a Ni or Ni alloy containing 2% to 10% of SiC having a particle size of 0.5μ to 5μ.

1 Claim, No Drawings

RELATIVE COMBINATION OF A CYLINDER AND A SEAL RING FOR INTERNAL COMBUSTION ENGINES

BACKGROUND OF THE INVENTION

The present invention is in the field of cylinders and seal rings for pistons, which are used in combination in internal combustion engines, and more particularly pertains to the selection of the materials of such rings and cylinders which mate during operation.

As is well known, internal combustion engines are run under high speed and high load conditions, which are quite sever on piston seal rings and cylinders. In order to provide a high wear resistance to the cylinder or the seal ring so as to accommodate them to such conditions, it is known to coat such cylinders or seal rings with Ni or an alloy thereof containing SiC, or to use as the cylinder base metal Al or an alloy thereof containing Si. By using cylinders and seal rings coated as described, the service life of the internal combustion engine can be improved. The improved characteristics are due to the fact that SiC and Si have a high degree of hardness. The SiC particles contained in the Ni or Ni alloy coating member and the Si particles contained in the Al or Al alloy base member tends to project out from the surface as the cylinder or ring wears, and to form a hard sliding face relative to the opposite mating member. On the other hand, the surface portions containing neither SiC nor Si particles wear to form pores in which oil is retained. This prevents scuffing and provides a good wear resistance over a prolonged period even under poor lubricating conditions.

SUMMARY OF THE INVENTION

It is an object of the present invention to provide the optimum combination of materials and particle sizes and percentages for the surfaces of seal rings and cylinders which are mated in an internal combustion engine.

It has been discovered, based upon several experiments, that the optimum combination of surface materials for the cylinder and seal ring are:
1. a cylinder
   (a) formed of a base metal of Al or Al alloy and containing at least in the surface wear portion thereof 13% to 23% of Si having particle size of $5\mu$ to $8\mu$, or
   (b) having a coating of Ni or Ni alloy and containing therein 3% to 8% of SiC having particle size of $0.5\mu$ to $5\mu$, and
2. a seal ring having a coating of Ni or Ni alloy and containing therein 2% to 10% of SiC having particle size of $0.5\mu$ to $5\mu$.

DETAILED DESCRIPTION OF THE INVENTION

It is noted at the outset that the invention herein does not reside in the selection and use of any particular alloy of Ni or alloy of Al, in which the specific quantities of SiC and Si are embedded. As previously noted it is known to use Ni or Ni alloys with SiC therein and Al or Al alloys with Si therein as the wear surface material of rings and cylinders in internal combustion engines. Typical of suitable Ni alloys are those which contain either phosporous or boron, such as Ni-P or Ni-B. In the case of aluminum alloy, Al-Si are particularly suitable. Additionally, methods of providing SiC and Si particles in Ni or Ni alloy coatings and Al or Al alloys are known in the art.

The SiC particles contained in the Ni or Ni alloy coating member and the Si particles contained in the Al or Al alloy base member are limited relatively in particle size and content.

First, the particle size of the SiC contained in the Ni or Ni alloy coating member is especially limited in the range of $0.5\mu$ to $5\mu$. The coating member will have insufficient wear resistance if the SiC particle size is less than $0.5\mu$, and will have insufficient strength, thereby decreasing the hardness and machinability of the cylinder, if the SiC particle size is greater than $5\mu$. The amount of the SiC is limited especially to the range of 3% to 8%. A smaller amount of SiC will be insufficient to produce the desired wear resistance, and a larger amount of SiC will result in too great a wear of the mating seal ring.

Second, the particle size of the Si contained in the Al or Al alloy base member of the cylinder is especially limited to the range of $5\mu$ to $8\mu$. The cylinder will have insufficient wear resistance if the Si particle size is smaller than the range and will have insufficient strength and machinability if the Si particle size is larger than the range. The amount of the Si particles is also limited especially to the range of 13% to 23%. A smaller amount of Si will cause the base member to have insufficient wear resistance, and a larger amount of Si will cause the base member to have insufficient cutting property and strength. It will be noted that the specific quantity of Si particles need not be present throughout the cylinder base member, but is only required in the wear surface portion of the base member, i.e. the internal walls of the cylinder which mate with the piston seal ring. The actual depth of the region having the specified amount of particles is not critical. As used herein the term wear resistant surface means the surface portion which contacts another metal and a shallow depth below the surface portion which will wear away during normal operation.

The particle size of the SiC contained in the Ni or Ni alloy coating member of the seal ring is limited especially to the range of $0.5\mu$ to $5\mu$. The coating member has insufficient wear resistance if the SiC particle size is less than $0.5\mu$. If the SiC particle size is larger than $5\mu$, the piston seal ring will have decreased strength and machinability. The amount of SiC used is also limited especially to the range of 2% to 10%. If a smaller amount is used, the desired wear resistance will not be obtained. If a larger amount is used the wear of the mating cylinder will increase.

Evidence of the wear resistance of the mated cylinder and seal ring having the above compositions can be seen from the tests described below.

As a first test piece (No. 1) representing a cylinder a cast iron material of type FC 25 was coated with a nickel-plated layer containing 7% by weight of SiC particles having a particle size of $3\mu$. A conventional plating technique was used. The hardness of test piece No. 1 was HV 700. As a second test piece (No. 2) representing a cylinder, an aluminum alloy base member containing 20% by weight of Si particles having a particle size of $7\mu$ was used. In both cases, the particles were included in the materials by known methods.

Wear resistance tests were carried out on each test piece using a rotary wear testing machine under the following test conditions:

Rotary disc material — FC 25 cast iron coated with Ni-plated layer containing 7% by weight of SiC having a particle size of 4μ

Hardness — HV 755

Lubricant temperature — 80° C

Lubricant amount — 0.6l/hr

Lubricant - Dufni oil No. 65 50% and kerosene 50%

Running distance — 300 Km

The test results indicated wear amounts of the test pieces Nos. 1 and 2 of 0.0073 and 0.0098 mg/cm² Km, respectively, and the wear amounts of the rotary disc when used to test pieces Nos. 1 and 2 were 0.0015 and 0.0018 mg/cm² Km, respectively.

For confirming the improved wear resistance achieved by the combination of cylinder and ring compositions according to the invention, wear resistance tests were also carried out with the test pieces No. 1 and No. 2 combined with a rotary disc covered with chromium plating (HV700). The test results using the chromium plated disc indicated wear amounts of the test pieces Nos. 1 and 2 of 0.0088 and 0.0103 mg/cm² Km, respectively, and the wear amounts of the rotary disc relative to the test pieces Nos. 1 and 2 of 0.0057 and 0.0048 mg/cm² Kg, respectively.

In order to provide a higher wear resistance, one or more metal oxides such as $Al_2O_3$, metal carbides such as WC, nitrides, and the like having a relatively high hardness may be mixed in addition to the SiC contained in the Ni or Ni alloy coating member or the Si contained in the Al or Al alloy base member.

As mentioned above, the present invention is attained from the view of that either Ni or Ni alloy containing SiC or Al or Al alloy containing Si is superior in wear resistance. That is, the present invention is a relative combination of a cylinder either covered with Ni or Ni alloy containing SiC under special conditions or having an Al or Al alloy base member containing Si under special conditions and a seal ring covered with Ni or Ni alloy containing SiC under special conditions, which is remarkably superior in wear resistance and suitable for the latest internal combustion engines.

What is claimed is:

1. In an internal combustion engine having a cylinder wall mating with a piston seal ring, the improvement comprising,
    (a) the wear resistant surface of said cylinder wall being formed of a material selected from the group consisting of (i) aluminum or aluminum alloy containing 13 to 23 percent by weight of silicon particles having particle size of 5μ to 8μ, and (ii) nickel or nickel alloy containing 3 to 8 percent of silicon carbide particles having particle size of 0.5μ to 5μ, and
    (b) the wear resistant surface of said piston seal ring being a coating of nickel or nickel alloy containing 2 to 10 percent of silicon carbide having particle size of 0.5μ to 5μ.

* * * * *